US009559581B2

(12) United States Patent
Mi et al.

(10) Patent No.: US 9,559,581 B2
(45) Date of Patent: Jan. 31, 2017

(54) SINGLE PHASE BI-DIRECTIONAL AC-DC CONVERTER WITH REDUCED PASSIVE COMPONENTS SIZE AND COMMON MODE ELECTRO-MAGNETIC INTERFERENCE

(71) Applicant: The Regents of The University of Michigan, Ann Arbor, MI (US)

(72) Inventors: Chris Mi, Detroit, MI (US); Siqi Li, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 137 days.

(21) Appl. No.: 14/251,080

(22) Filed: Apr. 11, 2014

(65) Prior Publication Data

US 2014/0313795 A1  Oct. 23, 2014

Related U.S. Application Data

(60) Provisional application No. 61/812,969, filed on Apr. 17, 2013.

(51) Int. Cl.
*H02M 7/515* (2007.01)
*H02M 1/44* (2007.01)
(Continued)

(52) U.S. Cl.
CPC ............. *H02M 1/44* (2013.01); *H02M 1/126* (2013.01); *H02M 7/797* (2013.01);
(Continued)

(58) Field of Classification Search
CPC ................................ H02M 1/126; H02M 1/44
(Continued)

(56) References Cited

U.S. PATENT DOCUMENTS 4,277,692 A   7/1981 Small
5,083,101 A *  1/1992 Frederick ............ H03H 1/0007
                                                       333/12

(Continued)

FOREIGN PATENT DOCUMENTS

CN    2013-20893184      * 12/2013
JP    2009117807 A         5/2009

OTHER PUBLICATIONS

Grid-Interface Bidirectional Converter for Residential DC Distribution Systems—Part 2: AC and DC Interface Design With Passive Components Minimization, IEEE Transactions On Power Electronics, vol. 28, No. 4 (Apr. 2013).

*Primary Examiner* — Adolf Berhane
*Assistant Examiner* — Nusrat Quddus
(74) *Attorney, Agent, or Firm* — Harness, Dickey & Pierce, PLC

(57) ABSTRACT

A bidirectional AC-DC converter is presented with reduced passive component size and common mode electro-magnetic interference. The converter includes an improved input stage formed by two coupled differential inductors, two coupled common and differential inductors, one differential capacitor and two common mode capacitors. With this input structure, the volume, weight and cost of the input stage can be reduced greatly. Additionally, the input current ripple and common mode electro-magnetic interference can be greatly attenuated, so lower switching frequency can be adopted to achieve higher efficiency.

15 Claims, 7 Drawing Sheets

(51) Int. Cl.
  *H02M 1/12* (2006.01)
  *H02M 7/797* (2006.01)
  *H02M 7/523* (2006.01)
  *B60L 11/18* (2006.01)
  *H02M 1/42* (2007.01)
  *H02M 7/162* (2006.01)

(52) U.S. Cl.
  CPC ........ *B60L 11/1809* (2013.01); *H02M 1/4233* (2013.01); *H02M 7/1626* (2013.01); *H02M 2001/123* (2013.01); *Y02B 70/126* (2013.01); *Y02T 10/7005* (2013.01); *Y02T 10/7072* (2013.01); *Y02T 90/127* (2013.01); *Y02T 90/14* (2013.01)

(58) Field of Classification Search
  USPC ............ 363/39–47, 50, 52, 56, 95, 96, 126; 333/167, 25; 343/859; 361/91.1, 111; 318/800; 307/105
  See application file for complete search history.

(56) References Cited

U.S. PATENT DOCUMENTS

| | | | | |
|---|---|---|---|---|
| 5,195,232 A | * | 3/1993 | Frederick | H03H 1/0007 29/602.1 |
| 5,619,079 A | * | 4/1997 | Wiggins | H02M 9/005 307/105 |
| 5,747,981 A | * | 5/1998 | Callanan | 323/362 |
| 5,834,902 A | * | 11/1998 | Deurloo et al. | 315/209 R |
| 5,990,654 A | * | 11/1999 | Skibinski | H02M 1/126 307/105 |
| 6,122,182 A | * | 9/2000 | Moisin | H02M 5/22 363/39 |
| 6,163,470 A | | 12/2000 | Chavez et al. | |
| 6,735,097 B1 | | 5/2004 | Prasad et al. | |
| 6,978,011 B1 | * | 12/2005 | Bailey | H04L 12/66 379/390.02 |
| 7,440,300 B2 | | 10/2008 | Konishi et al. | |
| 7,596,006 B1 | * | 9/2009 | Granat | H02M 1/126 323/224 |
| 7,898,827 B2 | * | 3/2011 | Ganev | H02M 1/44 363/39 |
| 7,932,777 B1 | * | 4/2011 | Zipfel, Jr. | H02N 2/065 330/10 |
| 8,174,810 B2 | * | 5/2012 | Tallam | H02H 9/005 333/25 |
| 8,174,856 B2 | | 5/2012 | Chapman | |
| 2004/0095784 A1 | | 5/2004 | Zhou | |
| 2007/0159860 A1 | * | 7/2007 | Haeberle | H02J 3/01 363/44 |
| 2008/0100400 A1 | * | 5/2008 | Lucas | H03H 7/427 333/181 |
| 2008/0192960 A1 | * | 8/2008 | Nussbaum | H03F 3/217 381/120 |
| 2009/0128258 A1 | * | 5/2009 | Xu | H03H 7/09 333/167 |
| 2009/0290392 A1 | * | 11/2009 | Ganev et al. | 363/39 |
| 2010/0188869 A1 | | 7/2010 | Fredette et al. | |
| 2011/0130889 A1 | | 6/2011 | Khajehoddin et al. | |
| 2011/0181128 A1 | | 7/2011 | Perreault et al. | |
| 2011/0221420 A1 | | 9/2011 | Coccia et al. | |
| 2012/0014144 A1 | | 1/2012 | Xu et al. | |
| 2015/0015197 A1 | * | 1/2015 | Mi | B60L 11/182 320/108 |

* cited by examiner

SINGLE PHASE BI-DIRECTIONAL AC-DC CONVERTER WITH REDUCED PASSIVE COMPONENTS SIZE AND COMMON MODE ELECTRO-MAGNETIC INTERFERENCE

CROSS-REFERENCE TO RELATED APPLICATIONS

This application claims the benefit of U.S. Provisional Application No. 61/812,969, filed on Apr. 17, 2013. The entire disclosure of the above application is incorporated herein by reference.

GOVERNMENT CLAUSE

This invention was made with government support under grant number DE-EE0002720 awarded by the Department of Energy. The government has certain rights in this invention.

FIELD

The present disclosure relates to single phase bi-directional AC-DC converter with reduced passive components size and common mode electro-magnetic interference.

BACKGROUND

Vehicle to grid (V2G) technology is expected to be commercialized in the near future. V2G uses the battery in vehicles as energy storage units for power system. It can help balance loads by valley filling and peak shaving. As an energy buffer stage, it will be very helpful for renewable power source, such as wind and solar power, by storing the excess energy during high power output period and providing it back at high load period. To realize the V2G function, a bi-directional on-board charger which can exchange energy between the power grid and a battery is needed. As the on-board charger transfers energy from the alternating current (AC) power system to direct current (DC), a low power factor charger will draw larger current from the power grid than a high power factor one for the same amount of real power consumed. The extra current means energy circulating which brings extra loss as well as the need of larger system capacity. Thus, a power factor correction (PFC) converter is a necessary front stage in medium to high power applications for the on-board charger. The above two reasons require a bi-directional AC-DC converter with PFC function for the on-board charger.

For an electric vehicle charger in SAE AC level 2, the input single phase AC power can be up to 19.2 kW. At this power level, the traditional topology with one inductor at the input stage will be bulky and expensive. However, if a smaller inductor is chosen, the input current harmonics will increase which needs a bigger EMI filter to meet the regulations. If higher switching frequency is adopted to reduce the input current ripple, it means more switching loss and lower efficiency.

For the on-board charger, size and weight is an important factor because the vehicle will always carry the charger. Efficiency is also very important because the energy will be transferred from power source to battery first and then from battery to load again. Every transfer wastes some energy. Low efficiency means huge energy waste. To achieve compact and efficient, there is a need to reduce the passive component size without increasing the switching frequency (the efficiency usually decrease when switching frequency increases).

In this disclosure, a high order input filter for the AC-DC converter is proposed, such that the passive component size can be reduced. The filter integrates both the differential and common mode function and the common mode EMI problem is solved easily. To control a converter with the proposed input filter topology, a model based method with reduced calculation and measurement is also developed, which makes fast and robust performance and low control cost at the same time.

This section provides background information related to the present disclosure which is not necessarily prior art.

SUMMARY

This section provides a general summary of the disclosure, and is not a comprehensive disclosure of its full scope or all of its features.

A bidirection AC-DC converter is provided with reduced passive component size and common mode electro-magnetic interference. The AC-DC converter includes a converter circuit configured to receive an AC input and an improved input filter interposed between the AC input and the converter circuit. The converter circuit is configured to receive an AC input from the input filter and output a DC signal. The input filter is comprised of a pair of common inductors, a pair of differential inductors, a differential capacitor and two common mode capacitors.

A first differential inductor in the pair of differential inductors has a first terminal electrically connected to one side of the AC input; whereas, a second differential inductor in the pair of differential inductors has a first terminal electrically connected to other side of the AC input. The first and second differential inductors are inductively coupled together and share a common core.

Additionally, a first common inductor in the pair of common inductors has a first terminal electrically coupled to a second terminal of the first differential inductor, and a second common inductor in the pair of common inductors has a first terminal electrically coupled to a second terminal of the second differential inductor. The first and second common inductors are inductively coupled together and share a common core.

A first common mode capacitor is electrically coupled between the second terminal of the first differential inductor and the positive terminal of capacitor $C_{out}$. A second common mode capacitor electrically is coupled between the second terminal of the second differential inductor and ground. A differential capacitor is electrically coupled across the AC input. More specifically, the differential capacitor has a first terminal electrically coupled to the second terminal of the first differential inductor and a second terminal electrically coupled to the second terminal of the second differential inductor.

In some embodiments, coupling coefficient for the pair of differential inductors is on the order of one; whereas, the coupling coefficient for the pair of common inductors is less than one.

In other embodiments, a second pair of differential inductors is coupled in series with the pair of common inductors. In this arrangement, a first differential inductor in the second pair of differential inductors has a first terminal electrically coupled to a second terminal of the first common inductor, and a second differential inductor in the second pair of differential inductors has a first terminal electrically coupled to a second terminal of the second common inductor. Again, the first and second common inductors are inductively coupled together and share a common core.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
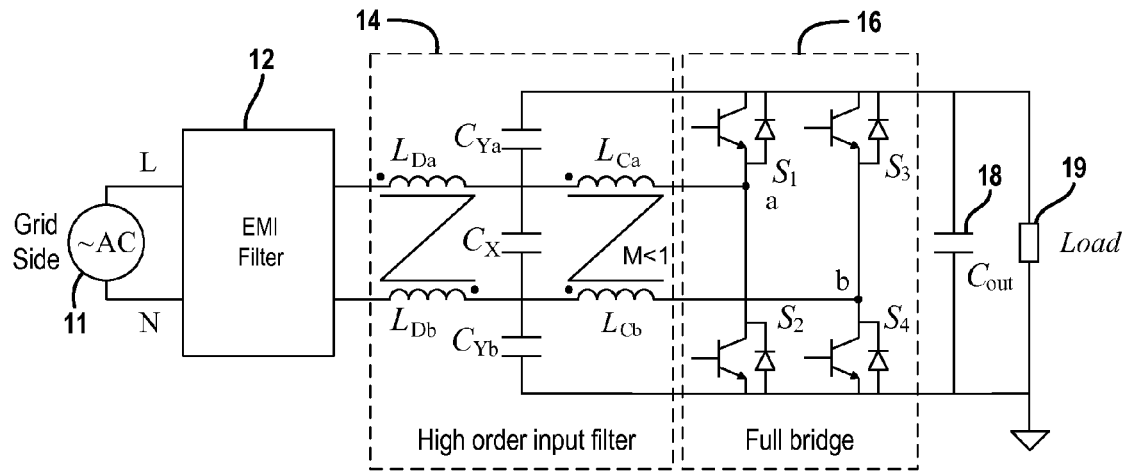
FIG. 1 is a schematic of a proposed bi-directional AC-DC converter.

FIG. 1 depicts an example embodiment for an AC-DC converter 10. The converter is comprised generally of an EMI filter 12, a high order input filter 14, a converter circuit 16 and an output capacitor 18. In an example embodiment, the load 19 is the secondary stage of an on-board charger, such as an isolated DC/DC converter. It is readily understood that any type of load can be used in this converter.

The high order input filter 14 is comprised of a pair of differential inductors ($L_{Da}$ and $L_{Db}$), a pair of common inductors ($L_{Ca}$ and $L_{Cb}$), a differential capacitor ($C_X$) and two common mode capacitors ($C_{Ya}$ & $C_{Yb}$). A first differential inductor $L_{Da}$ has a first terminal electrically connected to a load terminal of the AC input 11; whereas, a second differential inductor $L_{Db}$ has a first terminal electrically connected to other side (or neutral terminal) of the AC input 11. Of note, the first and second differential inductors ($L_{Da}$ and $L_{Db}$) are inductively coupled together and share a common core.

The pair of common inductors ($L_{Ca}$ and $L_{Cb}$) are electrically coupled in series with the pair of differential inductors ($L_{Da}$ and $L_{Db}$). That is, the first common inductor $L_{Ca}$ has its first terminal electrically coupled to a second terminal of the first differential inductor $L_{Da}$, and the second common inductor $L_{Cb}$ has its first terminal electrically coupled to a second terminal of the second differential inductor $L_{Db}$. The second terminal of each common inductor is electrically coupled to the converter circuit 16. Likewise, the first and second common inductors are inductively coupled together and share a common core. The common inductors ($L_{Ca}$ and $L_{Cb}$) operate to reduce the circulating common current in the converter In one embodiment, coupling coefficient for the pair of differential inductors ($L_{Da}$ and $L_{Db}$) is on the order of one; whereas, the coupling coefficient for the pair of common inductors ($L_{Ca}$ and $L_{Cb}$) is less than one. Other values for these coupling coefficients are also contemplated by this disclosure.

The differential capacitor $C_X$ is electrically coupled across the AC input and functions as a differential filter. In the example embodiment, the differential capacitor has one terminal electrically coupled to a node disposed between the first differential inductor and the first common inductor while the other terminal of the differential capacitor is electrically coupled to a node disposed between the second differential inductor and the second common inductor. It is envisioned that the differential capacitor may be disposed at other locations in the converter.

Two common mode capacitors $C_{Ya}$ & $C_{Yb}$ are used to cancel electromagnetic interference. One common mode capacitor $C_{Ya}$ is electrically coupled between the positive terminal of capacitor $C_{out}$ and a node disposed between the first differential inductor and the first common inductor; whereas, the other common mode capacitor $C_{Yb}$ is electrically coupled between ground and a node disposed between the second differential inductor and the second common inductor. These two capacitors $C_{Ya}$ & $C_{Yb}$ also attenuate the potential slew rate of PFC ground at switching.

Collectively, the differential inductors ($L_{Da}$ & $L_{Db}$), the common inductors $L_{Ca}$ & $L_{Cb}$ and the three capacitors $C_X$, $C_{Ya}$, $C_{Yb}$ perform like a three order LCL filter. The equivalent inductance, however, is much smaller than a conventional one order filter. The inductor size, cost and weight is proportional to the inductance at the same current, so significant cost savings can be achieved with this filter arrangement. Additionally, the symmetry of this filter arrangement reduces EMI problems.

During operation, the converter circuit 16 is configured to receive an AC input from the input filter 14 and output a DC signal. In the example embodiment, the converter circuit 16 is implemented as a full bridge inverter arrangement although other arrangements for the converter circuit also fall within the broader aspects of this disclosure.

In the example embodiment, the EMI filter 12 is interposed between the AC input 11 and the input filter 14. The EMI filer operates to filter electromagnetic interference. Because of the effectiveness of the input filter 14 at reducing electromagnetic interference, the size and complexity of the EMI filter can be reduced. In some case, the EMI filter 12 have be removed from the converter 10.

Figure 2:
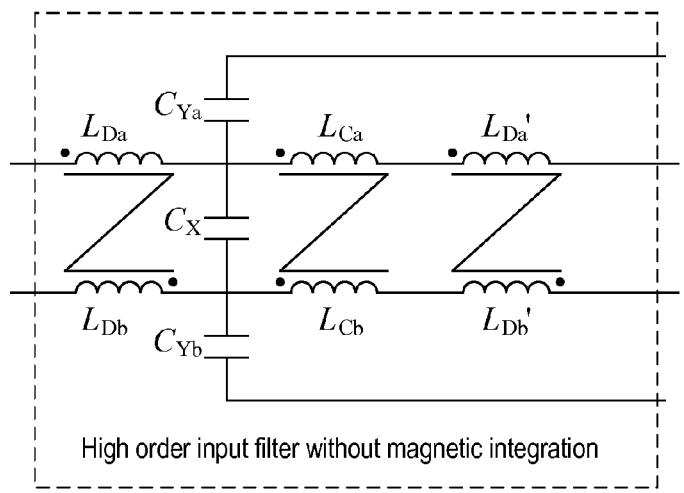
FIG. 2 is a schematic for an alternative embodiment of a high order input filter without magnetic integration.

FIG. 2 depicts an alternative embodiment for a high order input filer 14' without magnetic integration. The arrangement for this input filter 14' is similar to the input filter 14 described above. A second pair of differential inductors $L_{Da}'$ & $L_{Db}'$, however, is coupled in series with the pair of common inductors $L_{Ca}$ & $L_{Cb}$. That is, a first differential inductor $L_{Da}'$ in the second pair of differential inductors has a first terminal electrically coupled to a second terminal of the first common inductor $L_{Ca}$, and a second differential inductor $L_{Db}'$ in the second pair of differential inductors has a first terminal electrically coupled to a second terminal of the second common inductor $L_{Cb}$. The first and second differential inductors $L_{Da}'$ & $L_{Db}'$ are inductively coupled together and share a common core. During operation, the common current through $L_{Ca}$ & $L_{Cb}$ is much smaller than the differential current and thus only a small magnetic core is needed for $L_{Ca}$ & $L_{Cb}$ if the coupling coefficient is 1. The second pair of differential inductors ($L_{Da}'$ & $L_{Db}'$) is introduced to take place of the leakage inductance of $L_{Ca}$ & $L_{Cb}$. Although an additional component is introduced in this arrangement, the cost, size and weight is almost the same the input filter 14 shown in FIG. 1. Moreover, the design and manufacture process of the input filter 14' can be simplified.

Figure 3:
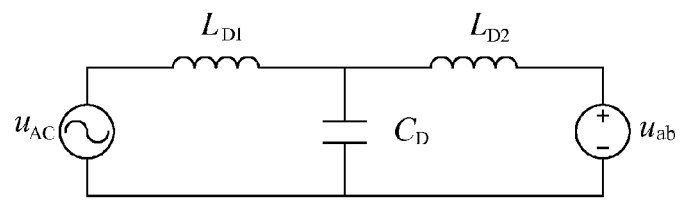
FIG. 3 is a diagram depicting a differential model of the proposed AC-DC converter.

FIG. 3 depicts the differential model for the AC-DC converter 10. $L_{D1}$, $L_{D2}$ and $C_D$ are the equivalent parameters of this model. The derivation of the model is given in the appendix. This model is used in the control algorithm described below.

Figure 4:
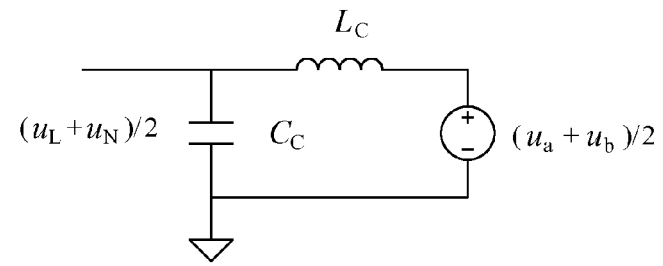
FIG. 4 is a diagram depicting a common model of the proposed AC-DC converter.

FIG. 4 depicts the common model of the AC-DC converter 10. $L_C$ and $C_C$ are the equivalent parameters of this model. The derivation for this model is also given in the appendix.

Figure 5:
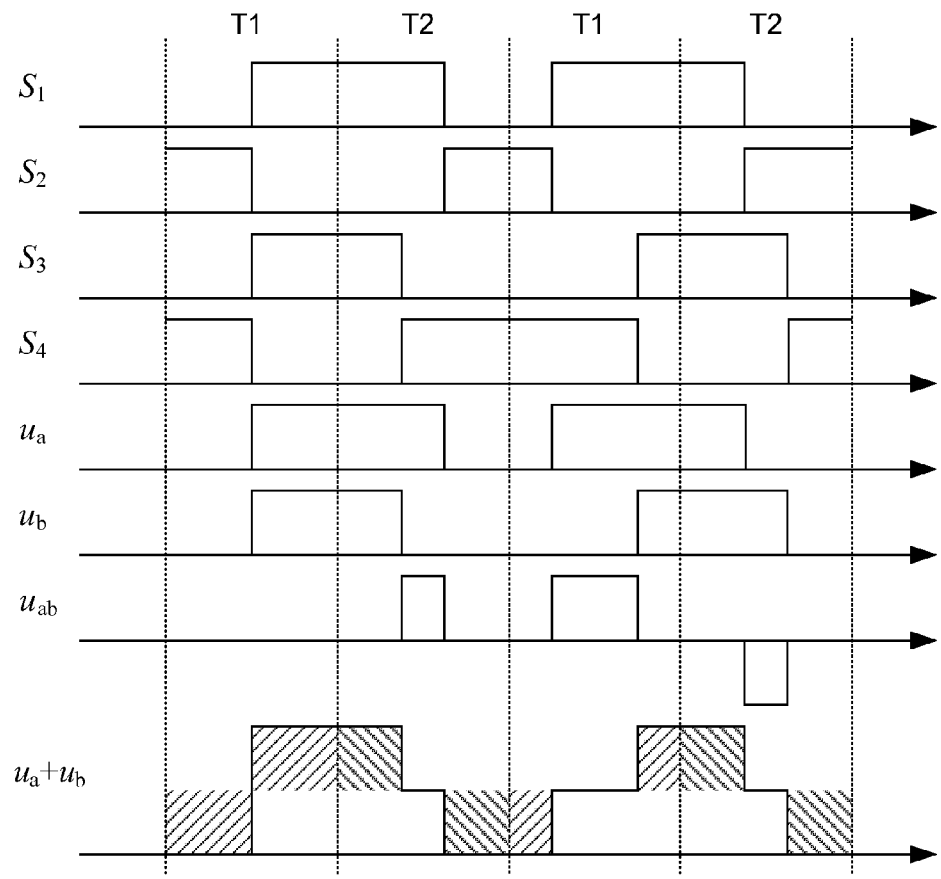
FIG. 5 is a timing diagram illustrating an example unipolar pulse width modulation scheme for the proposed AC-DC converter.

FIG. 5 illustrates an example unipolar PWM pattern of driving signals and resulting outputs which may be used in the AC-DC converter 10. IN particular, the driving signals for the switches in the full bridge inverter. In this example, the switching period is divided into two half period: first half T1 and second half T2. In real time control, there is always one control period delay. That is, in T1, the duty ratio is calculated for the next T2 and in T2, the duty ratio is calculated for next T1. This PWM pattern ensures that $\overline{u_a - u_b} = d \cdot u_{DC}$, $\overline{u_a + u_b} = u_{DC}$ in every one half period. Thus, the control period is half of the switching period. It is also noted that the common voltage output for point a and b is constant, thereby ensuring the stability of the common model shown in FIG. 4. Not only the output voltage $u_{ab}$ frequency is doubled to the switching frequency, also the control frequency is doubled, which provides superior performance for the converter 10. At each half period, the switching pattern keeps the average value constant to maintain a stable common mode voltage.

Figure 6:
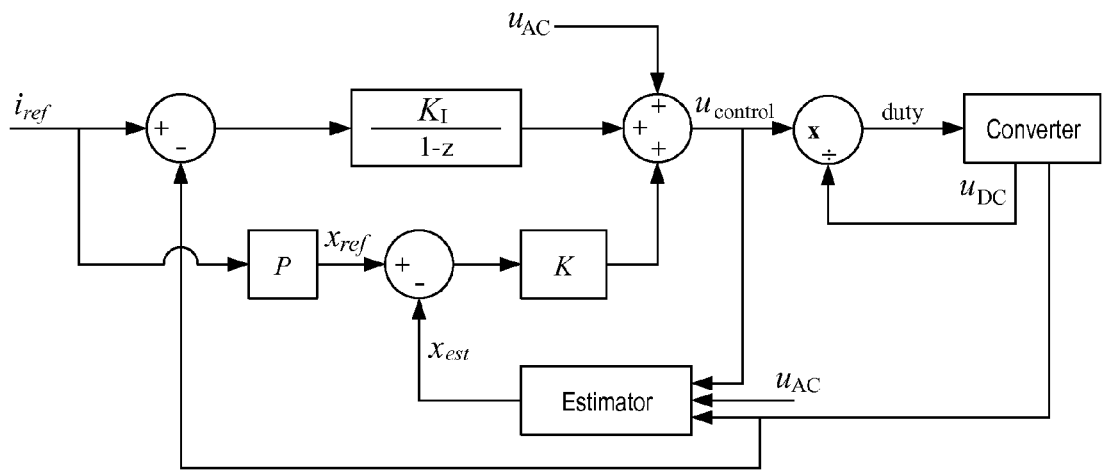
FIG. 6 is diagram depicting an example feedback control method for the proposed AC-DC converter.

FIG. 6 depicts an example current loop control diagram for the converter 10. The control of current loop is aimed at making the input current $i_{AC}$ to the converter track a given reference waveform $i_{ref}$. Grid side input voltage $u_{AC}$, input current $i_{AC}$ and DC side output voltage $u_{DC}$ are measured for control purposes. To get fast response and robust performance, state feedback control method is adopted in the system. The detail mathematic model and derivation is given in appendix later. In FIG. 6, a model based state feedback control method based on discrete model is used to control the converter circuit. The output of the controller is duty, which is the duty signal $u_{ab}$ shown in FIG. 5. In order to get a state estimation without additional hardware sensors, a Kalman state estimator is adopted in the control loop. With the advanced control method, the proposed circuit can do not only the DC voltage regulation, reactive power compensation functions, but can also be an active harmonic current filter, which could improve the power grid quality. Other types of control methods are also contemplated within the broader aspects of this disclosure.

Figure 7:
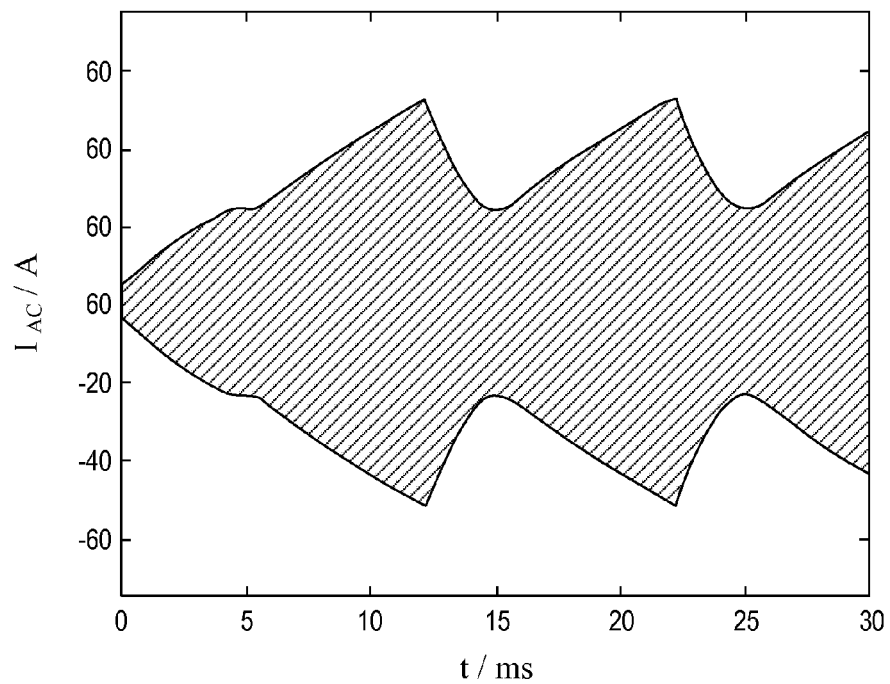
FIG. 7 is a graph depicting input current without the proposed feedback control method.

FIG. 7 shows the input current without the proposed control method when there is a 1 Vpp voltage source at the input filter resonant frequency. Because there is almost no damping for higher efficiency, a small voltage source at the resonant frequency will cause oscillation. To suppress the oscillation, a damping resistor is commonly placed in series with the capacitor, which brings extra loss. Also, because the weak stability of the system, it is hard to design a high gain compensator to realize fast response.

Figure 8:
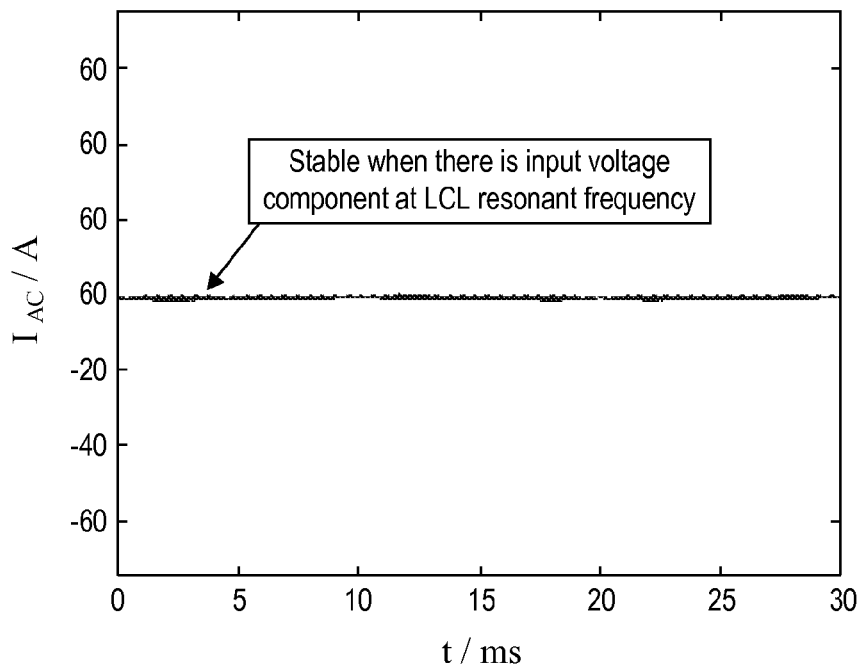
FIG. 8 is a graph depicting input current with the proposed feedback control method.

FIG. 8 shows the input current with the proposed control method when there is a 1 Vpp voltage source at the input filter resonant frequency. Even without a damping resistor, there is no oscillation and the efficiency is improved. Also, it is able to realize a high performance current tracking controller for the converter.

Figure 9:
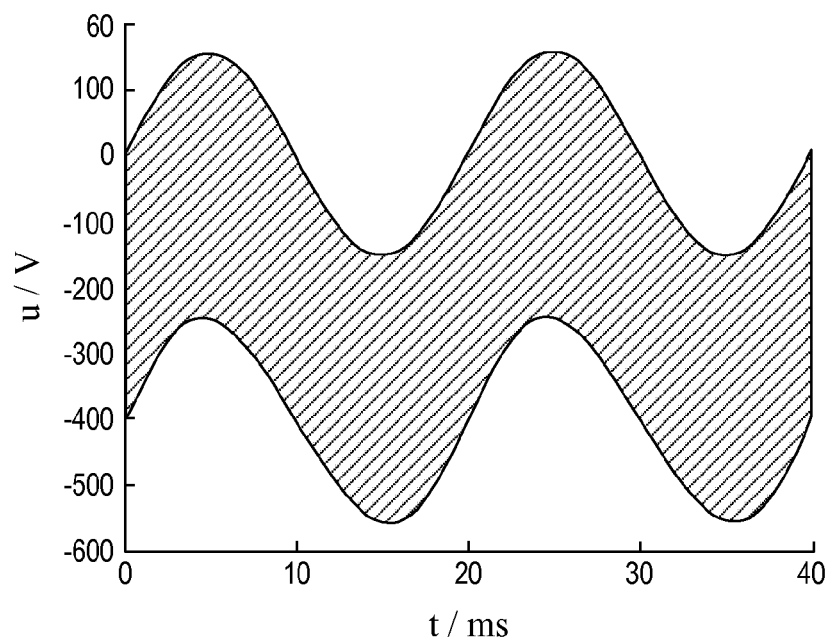
FIG. 9 is a graph depicting voltage between output ground and AC neutral line in a conventional converter with LCL input filter.
Figure 10:
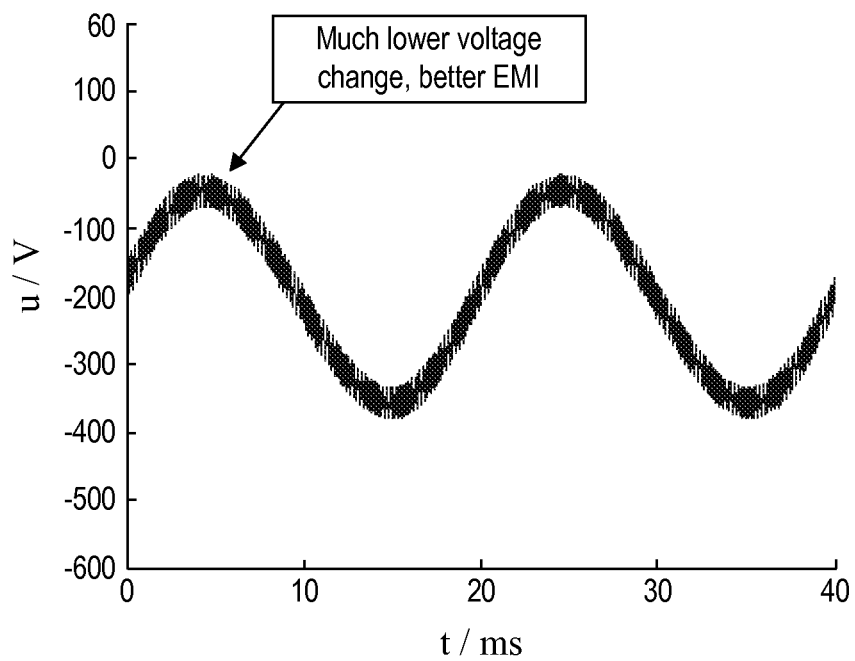
FIG. 10 is a graph depicting voltage between output ground and AC neutral line in the proposed AC-DC converter.

FIG. 9 shows the voltage between output ground and AC neutral line in a conventional converter with LCL input filter. The voltage swings a lot with an amplitude of the DC side voltage at a very short time, this means the potential slew rate of the converter is high. The stray capacitance between PFC ground and earth could bring sever EMI problems. In contrast, the voltage between the output ground and AC neutral line in the proposed converter 10 is shown in FIG. 10. The voltage is very smooth, this means the potential slew rate of PFC device is very low. The common mode EMI is positive proportion to the potential slew rate. Compared with the results in FIG. 9, converter 10 is much better in common mode EMI performance.

Figure 11:
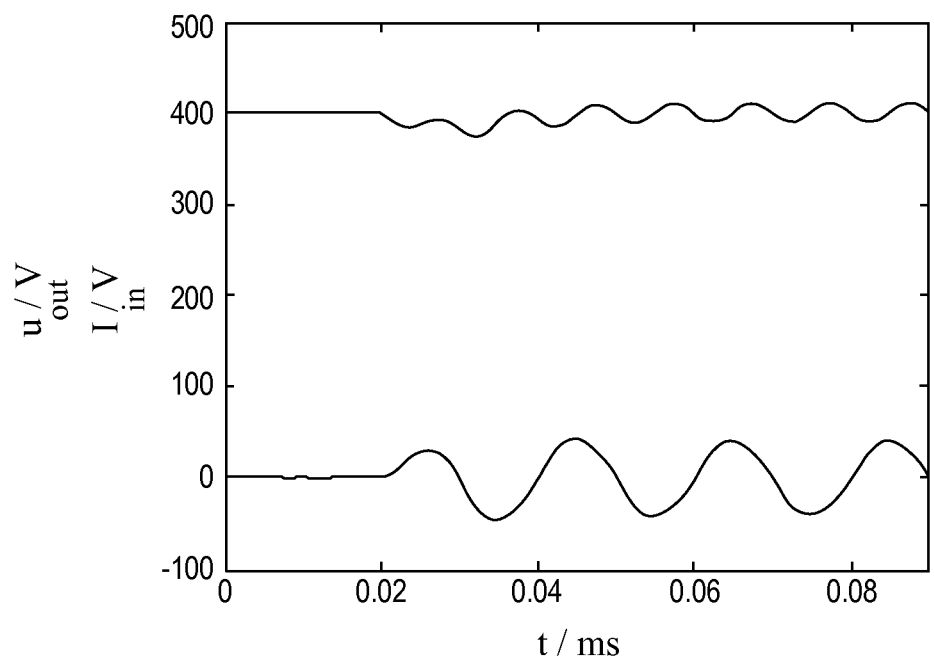
FIG. 11 is a graph depicting a load step response of the proposed AC-DC converter.

FIG. 11 shows the load step response for the proposed AC-DC converter 10. 6.4 kW load is applied at the output terminal. The system is stable and input current is in-phase with the input voltage.

Figure 12:
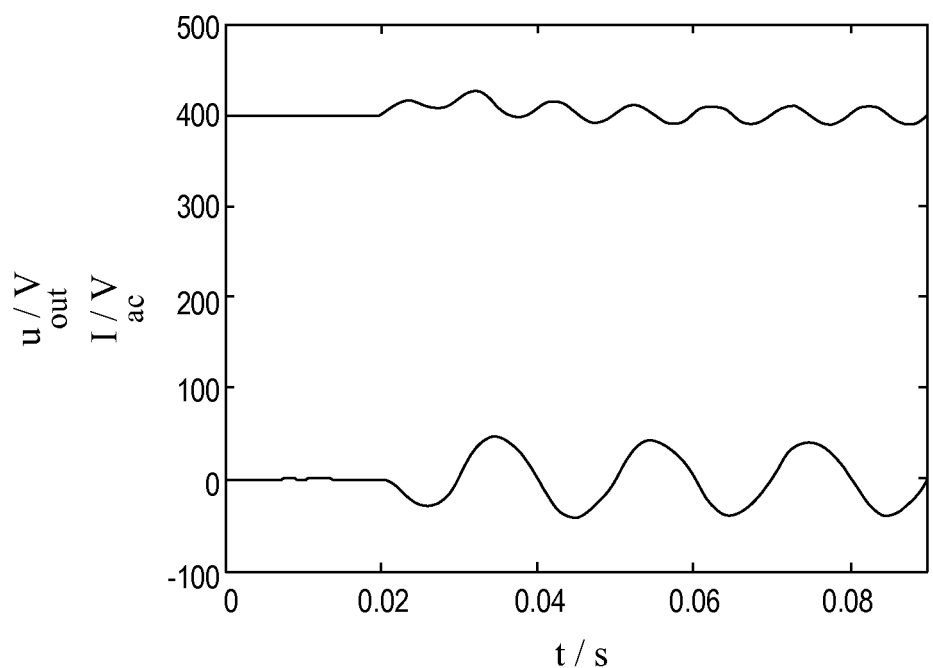
FIG. 12 is a graph depicting a source step response of the proposed AC-DC converter.

FIG. 12 shows the source step response of the proposed AC-DC converter. Again, 6.4 kW step power source is applied at the output terminal. The system is stable and AC side current is in 180° phase with the input voltage.

Figure 13:
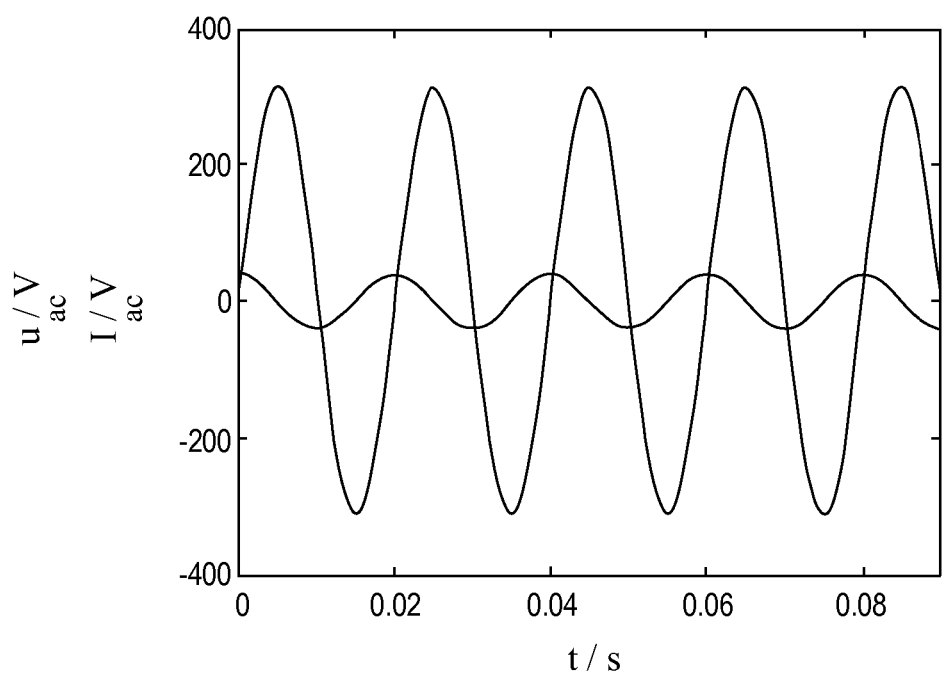
FIG. 13 is a graph illustrating the reactive power compensation results for the proposed AC-DC converter.

FIG. 13 illustrates the reactive power compensation results for the converter 10. The reference current can be set to any waveform using the control method shown in FIG. 6. Accordingly, the proposed converter 10 can perform the reactive power compensation function as well. In FIG. 11, the reference current is set 90° ahead of the input voltage, the control method shows very good tracking ability and the converter perform as a reactive power compensator well.

Figure 14:
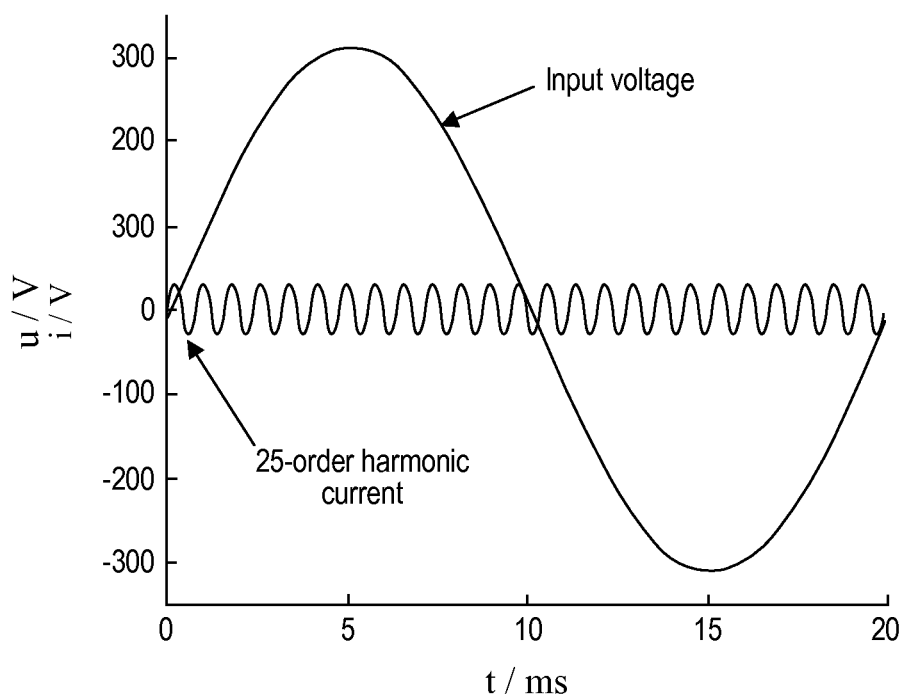
FIG. 14 is a graph illustrating the harmonic current injection results for the proposed AC-DC converter.

FIG. 14 shows the harmonic current injection results for the converter 10. The inductor of proposed input filter stage is small so fast current slew rate can be expected. This gives the converter 10 the capability of injecting high frequency current into power grid as a harmonic active filter. In FIG. 14, a 25-order harmonic current (1250 Hz) is injected into the power grid as an example.

One advantage of the present disclosure as compared to prior art is that each of the following features can be achieved concurrently: compact and low cost of input filter size; low input current ripple achieved at lower efficiency, so higher efficiency can be achieved; low common mode EMI; and fast and robust current tracking. The AC-DC converter can perform as a bi-directional PFC converter, as well as a reactive power compensator and active harmonic filter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

Derivation of the Differential and Common Models

The parameters are designed symmetrically, thus the value of inductors and capacitors can be expressed as $L_D=L_{Da}=L_{Db}$, $L_C=L_{Ca}=L_{Cb}$, $C_Y=C_{Ya}=C_{Yb}$. Following equations could be got:

$$4L_D \dot{i}_{AC} = u_{AC} u_{C_X} \quad (1)$$

$$L_{Ca} \dot{i}_a - M \dot{i}_b = U_{PFC} - u_{CYa} - u'_a \quad (2)$$

$$L_{Cb} \dot{i}_b - M \dot{i}_a = u'_b - u_{CYb} \quad (3)$$

$$C_{Ya} \dot{u}_{CYa} + i_{AC} = C_X \dot{u}_{CX} + i_a \quad (4)$$

$$C_{Yb} \dot{u}_{CYb} + i_{AC} = C_X \dot{u}_{CX} + i_b \quad (5)$$

$$U_{PFC\_GND} + u_{CYb} = (u_{AC} - u_{CX})/2 \quad (6)$$

$$U_{PFC\_VCC} - u_{CYb} = (u_{AC} - u_{CX})/2 \quad (7)$$

$$u_a = u'_a + U_{PFC\_GND} \quad (8)$$

$$u_b = u'_b + U_{PFC\_GND} \quad (9)$$

$$U_{PFC} = U_{PFC\_VCC} - U_{PFC\_GND} \quad (10)$$

(2)+(3)

$$2L_k \cdot \frac{\dot{i}_a + \dot{i}_b}{2} = u_{CX} - (u'_a - u'_b) \quad (11)$$

where $L_k=L_C-M$, which is the leakage inductance of the coupled inductors $L_{Ca}$ and $L_{Cb}$.

(2)−(3)

$$(L_c + M) \cdot (\dot{i}_a - \dot{i}_b) = U_{PFC} - (u_{CYa} - u_{CYb}) - (u'_a + u'_b) \quad (12)$$

(4)+(5)

$$\frac{i_a + i_b}{2} + C_X \cdot \dot{u}_{CX} = i_{AC} + C_Y \cdot \frac{\dot{u}_{CYa} + \dot{u}_{CYb}}{2} \quad (13)$$

from (13) we can get $$\frac{i_a + i_b}{2} + \left(C_X + \frac{C_Y}{2}\right) \cdot \dot{u}_{CX} = i_{AC} \quad (14)$$

(4)−(5)

$$C_Y \cdot (\dot{u}_{CYa} - \dot{u}_{CYb}) = i_a - i_b \quad (15)$$

$$i_a - i_b = i_C, \quad \frac{i_a + i_b}{2} = i_D,$$

$$u_{CYa} - u_{CYb} = u_C, \quad \frac{u_{CYa} + u_{CYb}}{2} = u_D,$$

$$u'_a + u'_b = u'_{abC}, \quad u'_a - u'_b = u_{ab}$$

We can get new equations, $$2L_k \dot{i}_D = u_{CX} - u_{ab} \quad (16)$$

$$(L_c + M) \cdot \dot{i}_C = U_{PDC} - u_C - u'_{abC} \quad (17)$$

$$i_D + \left(C_X + \frac{C_Y}{2}\right) \cdot \dot{u}_{CX} = i_{AC} \quad (18)$$

$$C_Y \dot{u}_C = i_C \quad (19)$$

From equations (1), (16), (18), a differential model could be derived as shown in FIG. 3, where $L_{D1}=4L_D$, $C_D=C_X+C_Y/2$, $L_{D2}=2L_k$ From equations (17), (19), a common model could be derived as shown in FIG. 4, where $L_{Ce}=L_C+M$, $C_C=C_Y$ Derivation of State Feedback Control with Kalman Estimator The differential equations could be write in matrix form:

$$\dot{X} = A \cdot X + B_1 \cdot u_{ab} + B_2 \cdot u_{AC}$$

$$y = C \cdot X$$

$$X = \begin{bmatrix} i_{AC} \\ u_{CX} \\ i_D \end{bmatrix}, \quad C = \begin{bmatrix} 1 & 0 & 0 \end{bmatrix}.$$

$$A = \begin{bmatrix} 0 & -\frac{1}{4L_D} & 0 \\ \frac{1}{C_X + \frac{C_Y}{2}} & 0 & -\frac{1}{C_X + \frac{C_Y}{2}} \\ 0 & \frac{1}{2L_k} & 0 \end{bmatrix}$$

$$B_1 = \begin{bmatrix} 0 \\ 0 \\ -\frac{1}{2L_k} \end{bmatrix} \quad B_2 = \begin{bmatrix} \frac{1}{4L_D} \\ 0 \\ 0 \end{bmatrix}$$

Then, discrete equations are derived based on the continuous ones above.

$$X(k-1) = A_d \cdot X(k) + B_{d1} \cdot u_{ab}(k) + B_{d2} \cdot u_{AC}(k)$$

$$A_d = \exp^{A \cdot T_s} B_{dn} = \left(\int_0^{T_s} \exp^{A \cdot T_s} \cdot dt\right) \cdot B_n$$

$T_s$ is the discrete step time.

To realize no static error performance, an extend the matrix for integral function is adopted.

$$\tilde{X}(k+1)=\tilde{A}_d\cdot\tilde{X}(k)+\tilde{B}_{d1}\cdot u_{ab}(k)+\tilde{B}_{d2}\cdot u_{AC}(k)$$

where $$\tilde{X}=\begin{bmatrix}x_i\\X\end{bmatrix}, \tilde{A}_d=\begin{bmatrix}1 & C\\0 & A_d\end{bmatrix}, \tilde{B}_{d1}=\begin{bmatrix}0\\B_{d1}\end{bmatrix}, \tilde{B}_{d2}=\begin{bmatrix}0\\B_{d2}\end{bmatrix}$$

To design a tracking controller, the first step is design a regulator to regulate all the state variables to zero. A full-state feedback controller is designed in the following form:

$$u_{ab}(k)=-\tilde{K}\cdot\tilde{X}(k), \text{ where } \tilde{K}=[K_1 K]$$

We use the optimal control theory,
The performance index is defined as:

$$J=\sum_{k=1}^{\infty}[\tilde{x}(k)\cdot Q\cdot\tilde{x}(k)+u_{ab}(k)\cdot R\cdot u_{ab}(k)]$$

The weighting matrix is designed as follows for example:

$$Q=\begin{bmatrix}8 & 0 & 0 & 0\\0 & 128 & 0 & 0\\0 & 0 & 0.01 & 0\\0 & 0 & 0 & 0.01\end{bmatrix} R=1$$

By minimizing $$J=\sum_{k=1}^{\infty}[\tilde{x}(k)\cdot Q\cdot\tilde{x}(k)+u_{ab}(k)\cdot R\cdot u_{ab}(k)]$$

We can get the solution $$\tilde{K}=[R+\tilde{B}_{d1}^T\cdot P\cdot\tilde{B}_{d1}]^{-1}\cdot\tilde{B}_{d1}^T\cdot P\cdot\tilde{A}_d$$

Where P is the solution of the following Riccati equation $$P=Q+\tilde{A}_d^T\cdot P\cdot[I+\tilde{B}_{d1}\cdot R^{-1}\cdot\tilde{B}_{d1}^T\cdot P]^{-1}\cdot\tilde{A}_d$$

To cancel the effect of input voltage $u_{AC}$, a feed-forward item is introduced. Then, we got the regulator design:

$$u_{ab}(k)=-\tilde{K}\cdot\tilde{X}(k)+u_{AC}(k)$$

If the regulator does not regulate all the state variables to zero but a reference value, a tracking controller could be got:

$$u_{ab}=-\tilde{K}\cdot(\tilde{X}-\tilde{X}_r)+u_{AC}$$

Where $$\tilde{X}_r=\begin{bmatrix}0\\i_{ref}\\u_{AC}\\i_{ref}\end{bmatrix}$$

is the reference value for the four state variables.

There are usually three sensors for traditional PFC: input AC current, input AC voltage, output DC voltage. There are three more variables needed in $\tilde{X}$. However, by using an estimator, we do not need more sensors to get the value in $\tilde{X}$. $x_i$ is a virtual variable, it can be calculated. The values of $u_{CX}$ and $i_D$ are estimated using a Kalman estimator. An estimator is designed in the following way.

$$\hat{X}(k)=\overline{X}(k)+L(y(k)-C\cdot\overline{X}(k))$$

$$\overline{X}(k+1)=A\cdot\hat{X}(k)+(B_{d1}\ B_{d2})\cdot\begin{pmatrix}u_{ab}(k)\\u_{AC}(k)\end{pmatrix}$$

$\hat{X}(k)$ Current estimate based on the current measurement
$\overline{X}(k)$ Predicted estimated based on a model prediction For each calculation, the difference of $y(k)-C\cdot\overline{X}(k)$ is used to correct the estimated value. The design of L could affect the performance of the estimator. A Kalman estimator design is used here.

$$X(k+1)=A\cdot X(k)+(B_{d1}\ B_{d2})\cdot\begin{pmatrix}u_{ab}(k)\\u_{AC}(k)\end{pmatrix}+(B_{d1}\ B_{d2})\cdot w(k)$$

$$y(k)=C\cdot X(k)+v(k)$$

Where $$w(k)=\begin{pmatrix}w_1(k)\\w_2(k)\end{pmatrix}$$

is the processing noise. And $v(k)$ is the measurement noise.

The noise level could be determined by the following factors $w_1(k)$: $u_{ab}$—PWM precision, measurement noise of $u_{DC}$
$w_2(k)$: $u_{AC}$—measurement noise of $u_{AC}$
$v(k)$: $i_{AC}$—measurement noise of $i_{AC}$ Then, the mathematical expectation of the noise could be defined:

$$Q=E\{ww^T\} R=E\{vv^T\}.$$

The estimator gain L could be calculated and the estimator could be designed.

What is claimed is:

1. An AC-DC converter, comprising:
 a converter circuit configured to receive an AC input and operates to convert the AC input to DC output; and
 an input filter interposed between the AC input and the AC-DC converter circuit, wherein the input filter comprising:
  a pair of differential inductors coupled across an AC input, wherein a first differential inductor in the pair of differential inductors has a first terminal electrically connected to one side of the AC input, and a second differential inductor in the pair of differential inductors has a first terminal electrically connected to other side of the AC input, the first and second differential inductors being inductively coupled together and sharing a common core;
  a pair of common inductors coupled in series with the pair of differential inductors, wherein a first common inductor in the pair of common inductors has a first terminal electrically coupled to a second terminal of the first differential inductor, and a second common inductor in the pair of common inductors has a first terminal electrically coupled to a second terminal of the second differential inductor, the first and second common inductors being inductively coupled together and sharing a common core;

a first common mode capacitor having a first terminal and a second terminal, where the first terminal of the first common mode capacitor is connected directly to the second terminal of the first differential inductor and the second terminal of the first common mode capacitor is connected directly to positive terminal of an output capacitor coupled across a load that receives the DC output;

a second common mode capacitor electrically coupled between the second terminal of the second differential inductor and ground; and a differential capacitor electrically coupled across the AC input.

2. The AC-DC converter of claim 1 further comprises a second filter interposed between the input filter and the AC input and configured to filter electromagnetic interference from the AC input.

3. The AC-DC converter of claim 1 wherein coupling coefficient for the pair of differential inductors is on the order of one.

4. The AC-DC converter of claim 3 wherein coupling coefficient for the pair of common inductors is less than one.

5. The AC-DC converter of claim 4 wherein the differential capacitor having a first terminal electrically coupled to the second terminal of the first differential inductor and a second terminal electrically coupled to the second terminal of the second differential inductor.

6. The AC-DC converter of claim 1 further comprises a second pair of differential inductors coupled in series with the pair of common inductors, wherein a first differential inductor in the second pair of differential inductors has a first terminal electrically coupled to a second terminal of the first common inductor, and a second differential inductor in the second pair of differential inductors has a first terminal electrically coupled to a second terminal of the second common inductor, the first and second common inductors being inductively coupled together and sharing a common core.

7. The AC-DC converter of claim 1 wherein the converter circuit is further defined as a full bridge inverter having four switches.

8. The AC-DC converter of claim 7 further comprises a controller that generates driving signals to the four switches, wherein the driving signals are changed during both a first half and a second half of a switching period.

9. The AC-DC converter of claim 8 wherein the controller operates to control output of the converter circuit using a Kalman state estimator.

10. A high order filter circuit, comprising:
a pair of differential inductors coupled across an AC input, wherein a first differential inductor in the pair of differential inductors has a first terminal electrically connected to one side of the AC input, and a second differential inductor in the pair of differential inductors has a first terminal electrically connected to other side of the AC input, the first and second differential inductors being inductively coupled together and sharing a common core;

a pair of common inductors coupled in series with the pair of differential inductors, wherein a first common inductor in the pair of common inductors has a first terminal electrically coupled to a second terminal of the first differential inductor, and a second common inductor in the pair of common inductors has a first terminal electrically coupled to a second terminal of the second differential inductor, the first and second common inductors being inductively coupled together and sharing a common core;

a first common mode capacitor having a first terminal and a second terminal, where the first terminal of the first common mode capacitor is connected directly to the second terminal of the first differential inductor and the second terminal of the first common mode capacitor is connected directly to positive terminal of an output capacitor coupled across a load that receives the DC output;

a second common mode capacitor electrically coupled between the second terminal of the second differential inductor and ground; and a differential capacitor electrically coupled across the AC input.

11. The high order filter of claim 10 wherein coupling coefficient for the pair of differential inductors is on the order of one.

12. The high order filter of claim 11 wherein coupling coefficient for the pair of common inductors is less than one.

13. The high order filter of claim 12 wherein the differential capacitor having a first terminal electrically coupled to the second terminal of the first differential inductor and a second terminal electrically coupled to the second terminal of the second differential inductor.

14. The high order filter of claim 10 further comprises a second pair of differential inductors coupled in series with the pair of common inductors, wherein a first differential inductor in the second pair of differential inductors has a first terminal electrically coupled to a second terminal of the first common inductor, and a second differential inductor in the second pair of differential inductors has a first terminal electrically coupled to a second terminal of the second common inductor, the first and second common inductors being inductively coupled together and sharing a common core.

15. The high order filter of claim 10 wherein the first common mode capacitor is electrically coupled in series with the second common mode capacitor.

* * * * *